Oct. 29, 1968  R. L. BRUBAKER  3,407,507
MEASURING INSTRUMENT

Filed April 10, 1967  2 Sheets-Sheet 1

INVENTOR.
REGINALD L. BRUBAKER
BY
R. E. Geanque
ATTORNEY

REGINALD L. BRUBAKER
INVENTOR.

BY R. E. Seangue
ATTORNEY

United States Patent Office 3,407,507
Patented Oct. 29, 1968

3,407,507
MEASURING INSTRUMENT
Reginald L. Brubaker, 1779 El Ray Road,
San Pedro, Calif. 90732
Continuation-in-part of application Ser. No. 526,168,
Feb. 9, 1966. This application Apr. 10, 1967, Ser.
No. 641,406
1 Claim. (Cl. 33—179)

ABSTRACT OF THE DISCLOSURE

A measuring instrument having a coiled, resiliently flexible band to be placed in surrounding relation to a work member and bearing a scale for indicating circumferential distances about the work member.

---

This application is a continuation-in-part of my copending application Ser. No. 526,168, filed Feb. 9, 1966, now abandoned and entitled Measuring Instrument.

This invention relates generally to measuring instruments; more particularly, the invention relates to an instrument for measuring circumferential distances about a work member as well as circumscribing the work member in a plane normal to its axis.

As will appear from the ensuing description, the measuring instrument of the invention may be used for various purposes including locating points in predetermined spaced relation about a work member, measuring the circumference of a work member, and circumscribing a work member normal to its axis. However, the instrument is intended primarily for use in the sign construction trade for locating diametrically opposite points on sign supporting posts and the like. For this reason, the invention will be described in connection with this particular application.

Many large signs for advertising and other purposes comprise one or more vertical tubular supporting posts which are secured at their lower ends to concrete footings embedded in the earth and at their upper ends to the main body of the sign. Attachment of these posts to the main body and/or the concrete footings for the posts often requires the formation of diametrically opposite openings in the posts to receive bolts or other fastenings. It is common practice in the trade to burn these openings through the posts with a torch. However, this task has been difficult to accomplish in the past owing to the lack of a proper instrument for accurately locating diametrically opposite points on the posts. The present invention provides a measuring instrument for this purpose. As noted earlier, and as will become evident in the ensuing description, the measuring instrument of the invention is not limited in usefulness to this application and may be employed for locating points in any desired angular or circumferentially spaced relation about a member of any shape in transverse cross section.

It is a general object of the invention, therefore, to provide a novel measuring instrument for the purposes described.

Another object of the invention is to provide a measuring instrument of the character described which is uniquely constructed to fit about and frictionally or magnetically grip the work member.

A further object of the invention is to provide a measuring instrument of the character described which is particularly useful in the sign construction trade for locating diametrically opposite points on tubular sign-supporting posts, and the like.

Yet a further object of the invention is to provide a measuring instrument of the character described which is simple in construction, economical to manufacture, easy to use, and otherwise ideally suited to its intended purposes.

Other objects, advantages, and features of the invention will become readily evident as the description proceeds.

With these and such other objects in view, the invention consists in the construction and arrangement of the invention, whereby the objects contemplated are attained, as hereinafter set forth, pointed out in the appended claim, and illustrated in the accompanying drawings.

Figure 1:
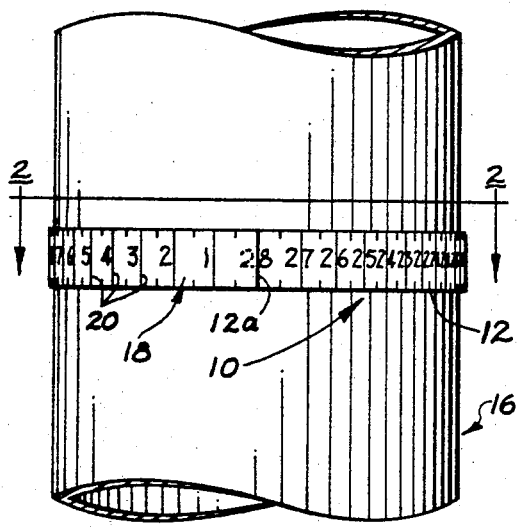
FIGURE 1 is an elevational view of a measuring instrument according to the invention, illustrating the invention installed on a cylindrical work member, such as a tubular sign-supporting post.
Figure 3:
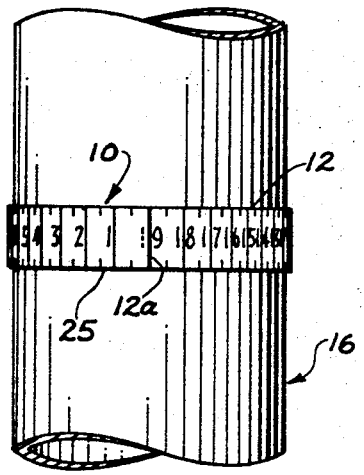
FIGURE 3 is a side elevation of the measuring instrument in FIGURES 1 and 2 installed on a cylindrical work member of smaller diameter.
Figure 2:
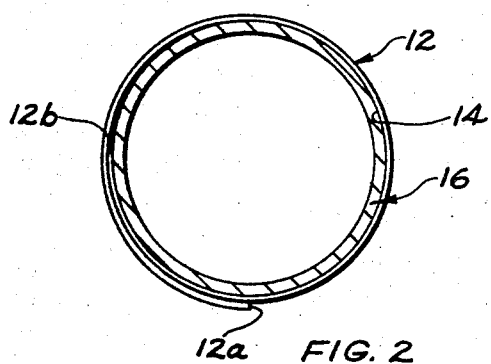
FIGURE 2 is a section, on reduced scale, taken on line 2—2 in FIGURE 1.

The measuring instrument 10 of the invention which has been selected for illustration in FIGURES 1–3 of these drawings comprises a coiled, resiliently flexible band 12 having overlapping ends. Band 12 may be constructed of spring steel, for example, and defines a central opening 14 for receiving a work member 16 on which points are to be located in predetermined spaced relation. The illustrated work member 16 is circular in transverse cross section and may comprise a tubular supporting post for a sign, for example. The central opening 14 through the band, therefore, is also circular in shape. It is evident at this point that the band 12 may be enlarged to a maximum diameter, wherein the end edges 12a, 12b of the band are approximately aligned. According to the preferred practice of the invention, the band, in its normal unstressed condition, assumes a normal diameter which is substantially less than the maximum diameter of the band. As a result, the band may be placed in surrounding, conforming relation to work members of different diameters, as illustrated in FIGURES 1 and 3. Moreover, when the band is placed around a work member having a diameter greater than the normal band diameter, the elasticity of the band causes the latter to frictionally grip and thereby remain in a fixed position relative to the member.

On the outer surface of the instrument band 12 is a scale 18 having a number of scale divisions 20 which are uniformly circumferentially spaced about the band. These scale divisions are designed by the series of numerals zero, one, two, three. . . . As may be observed in the drawings, the zero scale division is aligned with one end edge 12a of the band. The end portion of the band having the end edge 12a is disposed outermost, as shown best in FIGURE 2.

The instrument scale 18 may be provided in various ways. For example, the scale may be embossed in the outer surface of the band. Alternatively, the scale may be imprinted on a strip of paper, fabric, or plastic which is adhesively bonded to the outer surface of the band.

In use of the measuring instrument 10, the instrument band 12 is placed in surrounding relation to and is then constricted snugly about the work member 16 to be measured. Assume, for example, that two diametrically opposite points are to be located on the work member 16. In this case, a first mark, indicating one of the points, is made on the outer surface of the work member, in line with the end edge 12a of the band 12. The reading of the scale 18 at the band edge 12a is then noted. In FIGURE 1, for example, this scale reading is 28, whereas in FIGURE 3, the scale reading opposite the band edge 12a is 19. The scale reading thus obtained is mentally divided by two to obtain a half-scale reading, and a second mark is made on the outer surface of the work member 16 in line with the scale division 20 denoting this half-scale reading. Thus, in FIGURE 1, the second mark is made in line with the scale division 14. In FIGURE 3, the second mark is made opposite the scale division 9½. It is evident that the two marks thus made on the work member 16 are located diametrically opposite one another.

Figure 4:
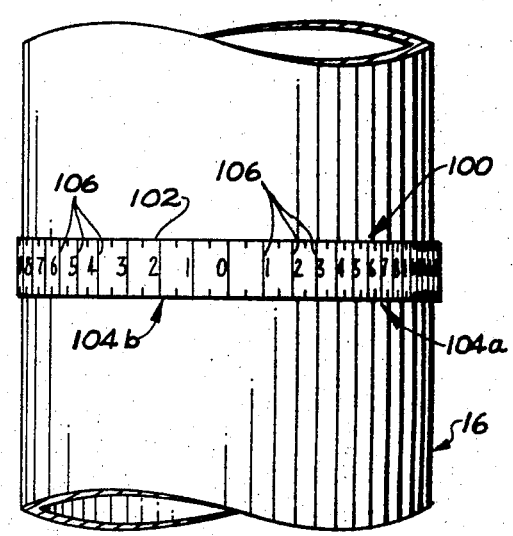
FIGURE 4 is a side elevation of a modified measuring instrument according to the invention, illustrating the instrument installed on a cylindrical work member.
Figure 5:
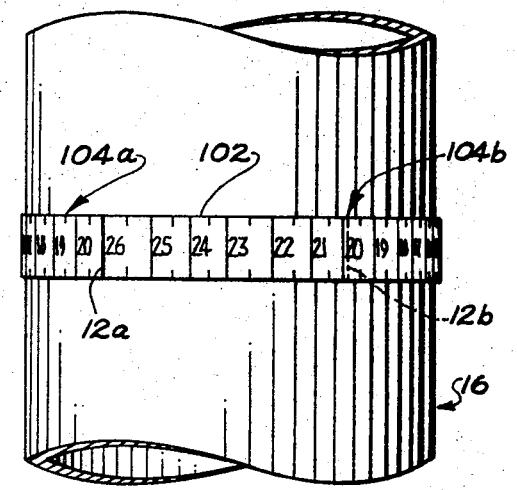
FIGURE 5 is an elevational view of the diametrically opposite side of the measuring instrument in FIGURE 4.

Reference is now made to FIGURES 4 and 5 illustrating a modified measuring instrument 100 according to the invention. Instrument 100 is identical to the instrument 10, described above, except that the coiled flexible band 102 of the instrument 100 has two scales 104a and 104b with equally circumferentially spaced scale divisions 106 designated by the series of numerals zero, one, two, three. . . . The two scales have a common zero scale division located midway between the ends 12a, 12b of the band 102, as shown in FIGURE 4.

In use, the band 102 of the instrument 100 is placed about a work member 16, as before. Assume that two diametrically opposite points are to be located on the work member. In this case, a first mark is made on the surface of the work member in line with the zero scale division. It is evident that the scale readings on the overlapping ends of the band, at a position diametrically opposite the zero scale division, will be the same. A second mark, therefore, is made on the work member 16 at the latter position about the band, that is, at the position where corresponding scale divisions of the scales 104a, 104b on the overlapping ends of the band are aligned. Accordingly, the two marks thus made on the work member 16 are located diametrically opposite one another.

Figure 6:
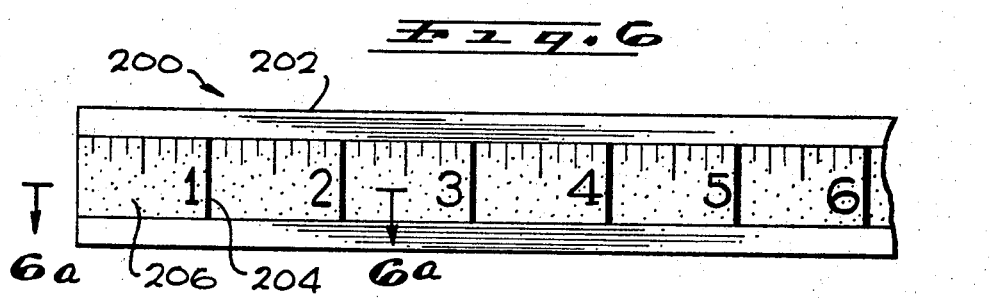
FIGURE 6 is a fragmentary view of a modified measuring instrument according to the invention.
Figures 6A, 6B:
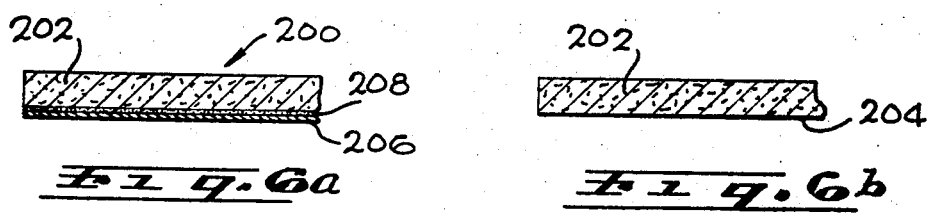
FIGURE 6a is an enlarged section taken on line 6a—6a in FIGURE 6.
FIGURE 6b is a section, similar to FIGURE 6a, through a further modified measuring instrument according to the invention.
Figure 7:
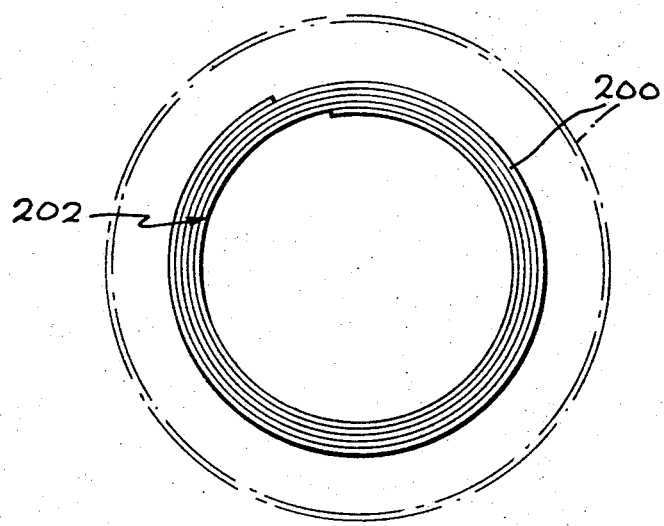
FIGURE 7 is an end view of the modified measuring instrument in FIGURE 6, illustrating the coiled shape of the instrument and, in phantom lines, the instrument expanded to a larger diameter.

The modified measuring instrument 200 illustrated in FIGURES 6, 6a and 7 comprises a coiled resiliently flexible band 202 which is magnetized to adhere to a magnetically permeable work member, such as a steel post, rather than to frictionally grip the work member, as do the measuring instruments illustrated in FIGURES 1–5. On the outer surface of the band 202 is a scale 204 for indicating distances along the band. In FIGURES 6, 6a and 7, the scale is printed on a tape 206 which is bonded, by an adhesive 208, to the band, as shown best in FIGURE 6a. Alternatively, the scale may be printed directly on the outer surface of the band, as shown in FIGURE 6b.

The magnetized band 202 of the measuring instrument 200 may be constructed of various materials. Preferably, however, the band comprises a resiliently flexible plastic or rubber composition impregnated with magnetically permeable particles, such as steel filings. Magnetic-particle-impregnated, rubber and plastic materials of this kind are, of course, widely available on the market.

Measuring instrument 200 is used in the same way as the measuring instruments described earlier, except that the instrument 200 is intended for use on a steel or other magnetically permeable work member to which the band will adhere by virtue of the magnetic attraction between the magnetized particles in the band and the work member. However, the magnetic measuring instrument 200 may be employed on nonmagnetically permeable work members if the instrument band 202 is manually or otherwise retained in position about the member. In this regard, an advantage of the magnetic property of the band resides in the fact that the adjacent, overlapping coils of the band tend to adhere to one another. Accordingly, if the band is constricted snugly about a nonmetallic work member, the magnetic attraction between the adjacent coils of the band may retain the instrument in position on the work member. Another advantage of the measuring instrument 200 is that the coiled instrument band 200, being constructed of a rubber or plastic composition, is more flexible or pliable than the metallic bands of the earlier measuring instruments of the invention and is thus capable of conforming to work shapes other than cylindrical, such as ellipsoidal work shapes. It is obvious, of course, that while the illustrated measuring instrument 200 is shown to have a scale 204 like that illustrated in FIGURES 1–3, the instrument may employ a modified scale arrangement similar to that shown in FIGURES 4 and 5.

It is evident at this point that the disclosed instruments of the invention may be used to advantage in the sign-making trade for locating diametrically opposite positions on tubular sign-supporting posts at which to burn or otherwise form fastener-receiving holes in the posts. These instruments, however, may obviously be employed for other purposes. For example, the instruments can be used simply to measure the circumference of a work member, or to locate points at predetermined circumferentially spaced intervals about a work member, or to locate points in predetermined angularly spaced relation about a work member other than a diametrically opposed relation.

As noted earlier, the split, resiliently flexible band of the present measuring instrument is preferably so constructed that it will frictionally grip the work member on which the band is placed. This, of course, is advantageous for the reason that the instrument will remain stationary in a fixed position on the work member while the latter is being marked. Thus, the instrument can be used as a guide to circumscribe a given work member and produce a true line perpendicular to the circumference of the work member. The device is generally usable by welders, pipe fitters and others in various fields such as drilling, piping, air conditioning, and sheet metal working.

Clearly, the invention herein described and illustrated is fully capable of attaining the several objects and advantages preliminarily set forth.

What is claimed as new in support of Letters Patent is:
1. A measuring instrument comprising:
   a coiled resiliently flexible band having overlapping ends and adapted to be placed in surrounding relation to a work member; and
   scale means on the outer surface of said band including scale divisions spaced longitudinally of said band for indicating circumferential distances about said work member;
   said band being magnetized to cling to a magnetically permeable work member;
   said band comprising a plastic composition such as rubber impregnated with magnetized particles.

References Cited

UNITED STATES PATENTS

| 2,663,941 | 12/1953 | Dart | 33—138 |
| 3,257,586 | 6/1966 | Steingroever | 335—303 |
| 1,432,605 | 10/1922 | Lawrence | 33—179 X |
| 2,106,729 | 2/1938 | Fichtol | 33—15 |

FOREIGN PATENTS

| 942,042 | 11/1963 | Great Britain. |
| 283,033 | 9/1952 | Switzerland. |

SAMUEL S. MATTHEWS, *Primary Examiner.*